United States Patent [19]

Emter

[11] Patent Number: 5,101,690
[45] Date of Patent: Apr. 7, 1992

[54] SAW BLADE TOP AND FACE GRINDER

[76] Inventor: James Emter, 23429 NE. 29th Ave., Ridgefield, Wash. 98642

[21] Appl. No.: 741,325

[22] Filed: Aug. 7, 1991

Related U.S. Application Data

[62] Division of Ser. No. 429,396, Oct. 31, 1989, Pat. No. 5,038,639.

[51] Int. Cl.⁵ .............................................. B23D 63/14
[52] U.S. Cl. ............................................ 76/41; 76/75; 76/78.1
[58] Field of Search .................. 76/37, 41, 39, 42, 43, 76/77, 75, 78.1, 79

[56] References Cited

U.S. PATENT DOCUMENTS 4,436,000 3/1984 Lenard et al. ........................... 76/41

Primary Examiner—Roscoe V. Parker
Attorney, Agent, or Firm—Chernoff, Vilhauer, McClung & Stenzel

[57] ABSTRACT

A top and face grinder for a circular saw blade includes an indexing apparatus which interposes a stop into the path of the teeth of the saw blade from a position laterally displaced from the plane of the saw blade. This stops rotation of the blade and permits a grinding operation to take place. At the end of the grinding operation the stop is retracted to permit continued rotation of the saw blade. The grinding stroke position of the grinding wheel is adjusted by rotating a cam which passes through the fulcrum of a rocker arm providing reciprocal motion for the grinding wheel.

4 Claims, 6 Drawing Sheets

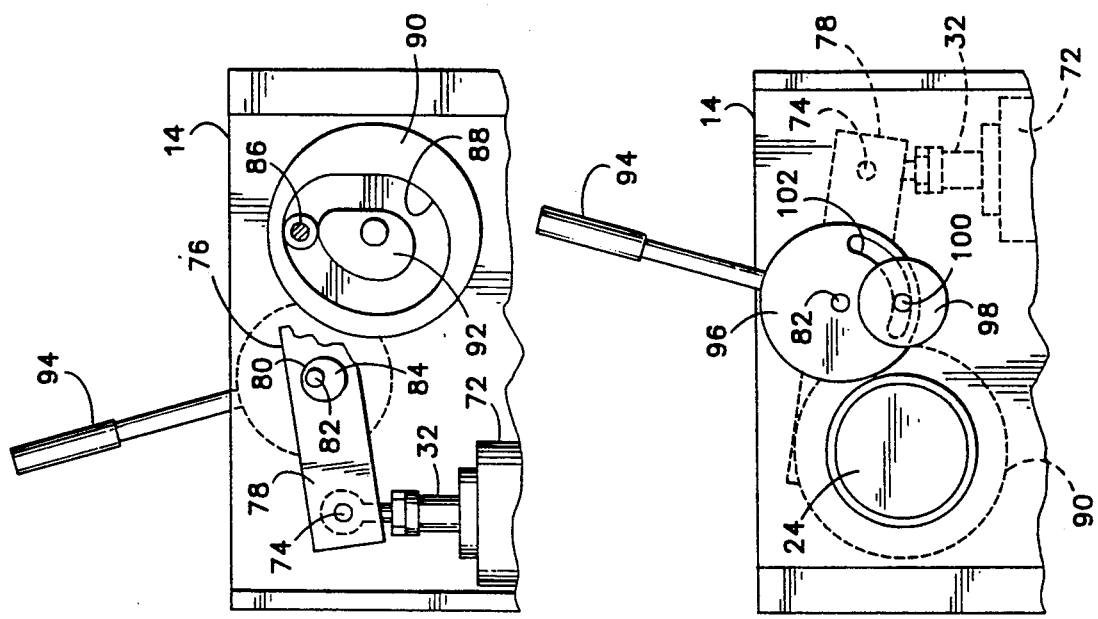
FIG. 7a
FIG. 7b
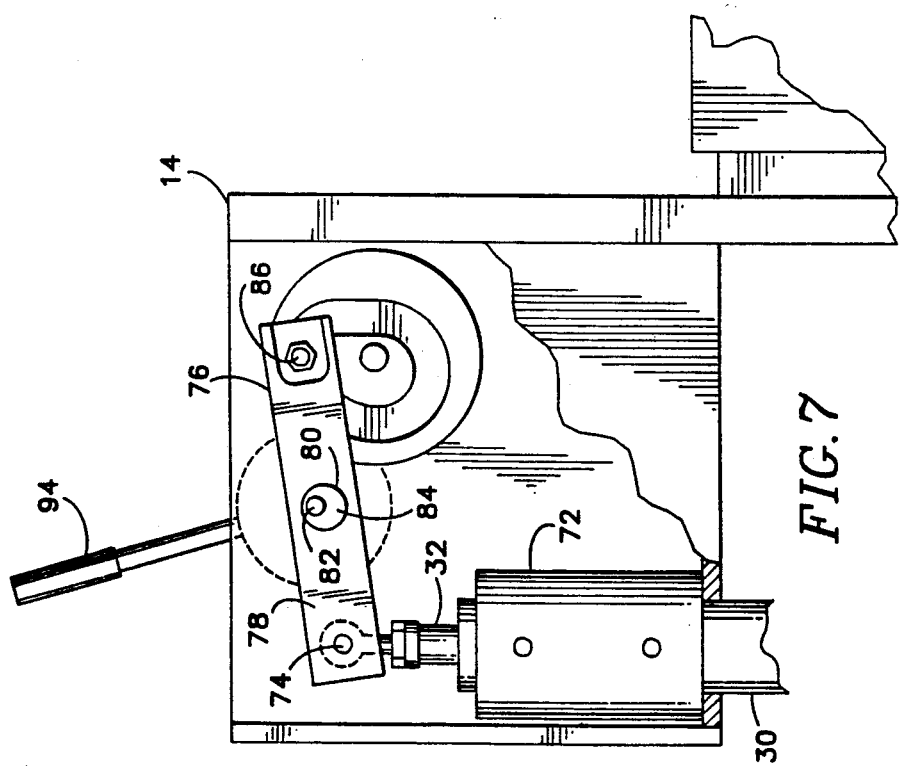
FIG. 7

SAW BLADE TOP AND FACE GRINDER

This is a divisional of copending application U.S. Ser. No. 07/429,396 filed on 10/31/89 and now U.S. Pat. No. 5,038,639.

Background of the Invention

The following invention relates to a top and face grinder for a circular saw blade and in particular relates to an indexing mechanism for the saw blade and a stroke position adjustment for a grinding wheel.

Top and face grinders of the top of the type commonly employed in the sawmill industry are sharpening machines for regrinding the top and face portions of the teeth of a circular saw blade. In order to grind each tooth of a circular saw blade, it is necessary to rotate the blade so that the teeth can be ground one at a time. The conventional method of indexing the teeth for each grinding operation is to rotate the saw blade while using an index finger located in the plane of the saw blade which acts as a stop. An arrangement of this type is shown in the context of a side grinding machine in my U.S. Pat. No. 4,823,649. Another example is shown in my U.S. Pat. No. 4,901,604 "Adjustable Automatic Dual Side Grinder With Quick Retract Cam" filed Apr. 3, 1989. In these machines as well as in conventional top and face grinding machines, the saw blade is rotated in a direction counter to the direction of cut, but the blade has a slight rotational bias in the opposite direction so that the index finger will drop over the top of an edge of a sawtooth and into scalloped area underneath the tooth as this rotational bias backs the scalloped portion of the blade against the top of the index finger. This operation is both complex and time consuming because the blade must rotate in two directions to bring each tooth into position for grinding. Additionally, the indexing mechanism must be frequently changed to accommodate saws having different spacings. Also, many saws are of the "skip tooth" variety and cannot be accommodated by conventional indexing mechanisms. Many times the index finger tends to ride too high or too low in the scallop area which consequently requires an adjustment in the position of the grinding wheels. Thus the conventional indexing mechanisms which rely upon fingers aligned in the vertical plane of the blade to catch these scalloped areas beneath the teeth have limited utility and are not versatile enough to accommodate saw blades of different sizes and configurations.

Different sized saws also require an adjustment in the grinding stroke position in order to properly grind each tooth of the blade. For each grinding operation, the grinding wheel must move reciprocally along a grinding stroke axis. The stroke length of the reciprocal motion must be deep enough to pass the grinding wheel across the face or top of the tooth, as the case may be, once for each tooth. With conventional top and face grinders, the operator usually sets the depth of the stroke and uses microswitches to actuate the piston, which carries the grinding wheel, at both the top and bottom of each stroke. Microswitches, however, are wear parts which are prone to failure after a certain number of grinding strokes.

Summary of the Invention

The indexing and adjustment problems noted above are solved by the present invention which is a top and face grinder for a planar circular saw which includes an indexing apparatus for interposing a stop into the path of an advancing sawtooth for a saw blade rotating in a cutting direction, so that a grinding operation can be performed upon another tooth of the saw blade. When the grinding operation is complete, a retractor removes the stop from the path of the advancing sawtooth to permit continued rotation of the saw blade. The stop is interposed into the path of the advancing tooth from the side of the saw blade and includes an index finger which is laterally movable towards and away from the plane of the saw blade. The saw blade is mounted on a shaft coupled to a slip clutch which senses the stop and releases the shaft, halting rotation of the saw blade. A side clamp, which may be hydraulically operated, frictionally engages the blade from the side to hold it in place for the grinding operation while the index finger is retracted. Once the grinding operation is complete, the index finger is repositioned to catch the next advancing sawtooth, the slip clutch reengages, and blade continues to rotate until the next tooth comes to rest against the index finger and the operation is repeated.

The top and face grinder of the invention also includes a powered grinding wheel supported on a bearing coupled to a piston which is movable along a grinding stroke axis to provide a reciprocating grinding stroke. The piston is connected to a rocker arm assembly which includes a beam pivoted about a fulcrum. A rotary drive including a cam which includes a race, engages a roller pin in the beam on an end opposite from the piston. The pin rides in the race and is driven by the cam to provide a reciprocating motion for the piston along the stroke axis. The depth is adjusted by a lever which rotates a cylindrical cam extending through the beam and eccentric to the axial line of the fulcrum. A clamp may used to selectively tighten the lever once the adjustment has been made. The drive cam and lever arm arrangement provides the necessary adjustability without the need for microswitches and the like.

It is a principal object of this invention to provide an improved indexing mechanism for a top and face grinder which allows fast and efficient regrinding of a circular saw blade.

A further object of this invention is to provide a stroke position adjustment for a top and face grinder which eliminates the need for microswitches.

A still further object of this invention is the provision of an indexing apparatus for a top and face grinder which can accommodate many different sized saw blades and differing tooth configurations.

A still further object of this invention is the provision of an accurate and simple-to-operate stroke position adjustment for a top and face grinder.

The foregoing and other objectives, features, and advantages of the invention will be more readily understood upon consideration of the following detailed description of the invention, taken in conjunction with the accompanying drawings.

Brief Description of the Drawings

FIG. 3a is a front view taken along line C—C of FIG. 3.

FIG. 7 is a partial cutaway view taken along line A—A of FIG. 1 showing the grinding stroke adjustment feature of the present invention.

FIG. 7a is a partial cutaway side view similar to FIG. 7 with a portion of the rocker arm cut away.

FIG. 7b is a partial front view of the apparatus of FIG. 1.

Detailed Description of the Invention

Figure 1:
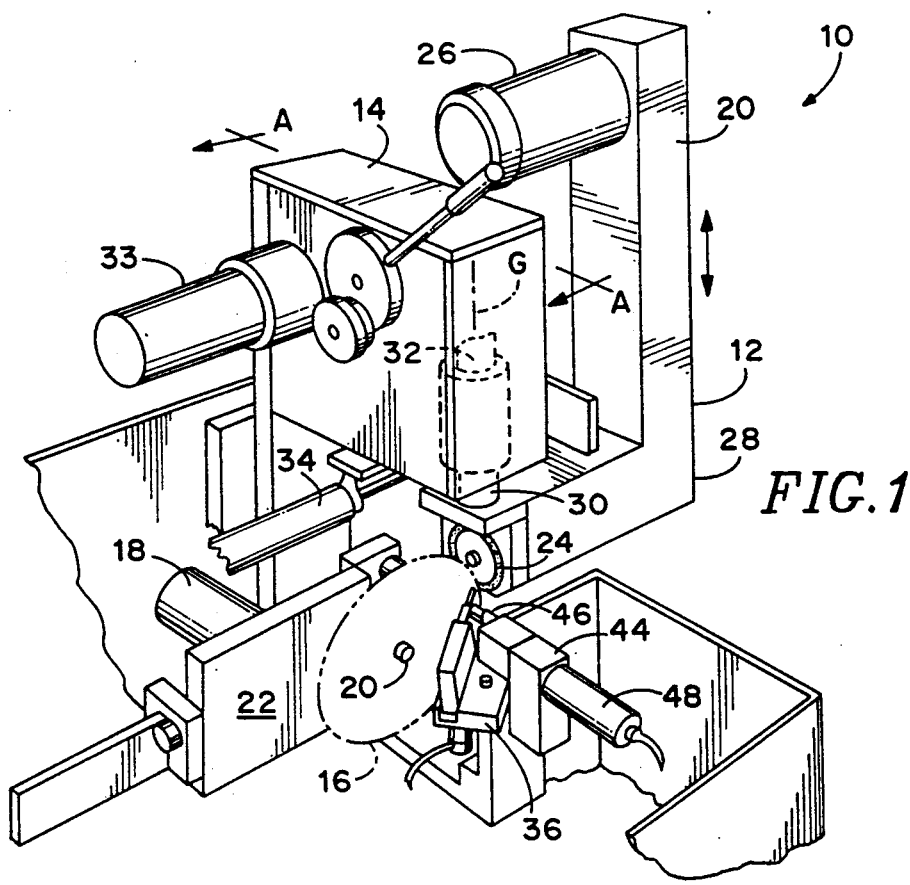
FIG. 1 is a partial perspective view of the top and face grinding machine of the present invention.

A top and face grinder 10 includes a grinding wheel assembly 12 and a drive assembly 14 which moves the grinding wheel assembly 12 reciprocally as indicated by the arrow in FIG. 1 along a grinding stroke axis G to grind the top and face portions of the teeth of a circular saw blade 16. The saw blade 16 is rotated in the direction of cut by a motor 18 coupled to a drive shaft 20 for the saw blade 16 through a slip clutch assembly 22. A grinding wheel 24 (as seen best in FIG. 2) is powered by an electric motor 26 coupled to the shaft 23 of the grinding wheel 24 by pulleys (not shown). The entire grinding wheel assembly 12 is an integral unit enclosed within a frame 28 which is suspended from a bearing 30 coupled to a drive piston 32. The piston 32 is driven by a motor 24 to cause the entire grinding wheel assembly 12 to move up and down along the central axis of the piston 32. The bearing 30 also permits rotation about the stroke axis of the piston 32. A hydraulic cylinder 34 is coupled to the frame 28 to cause such rotation if desired.

Figure 2:
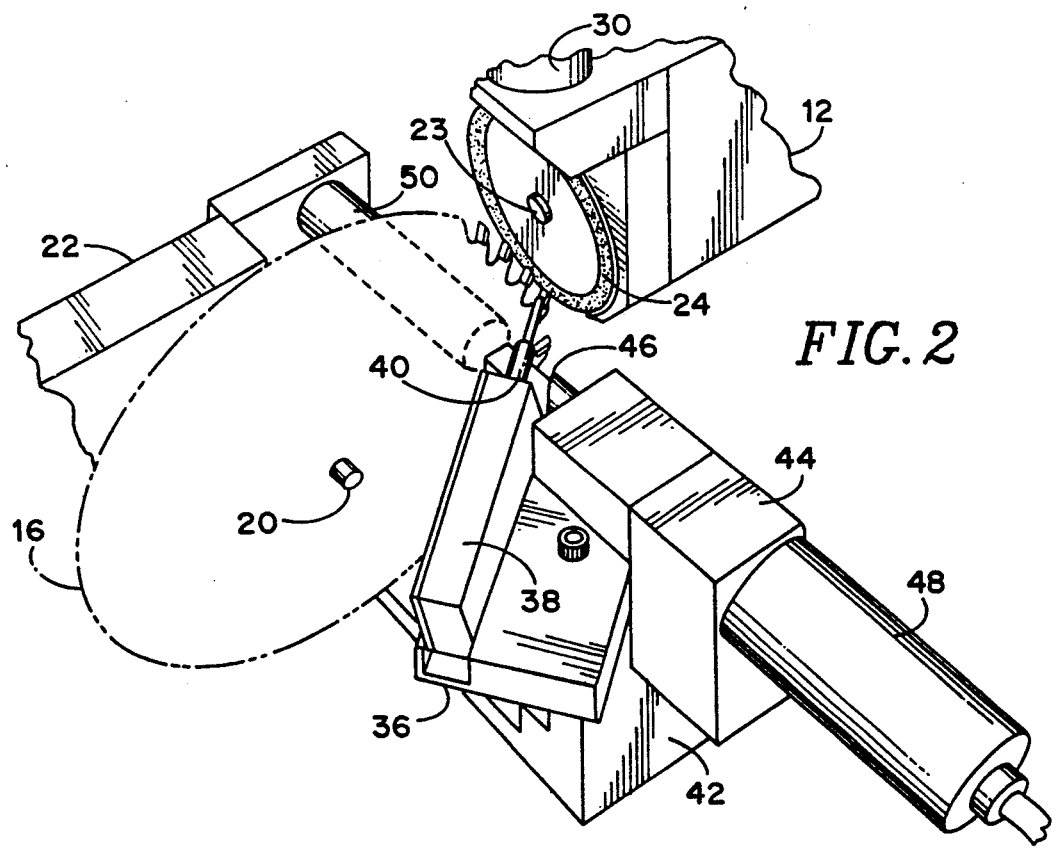
FIG. 2 is a perspective view of a portion of the machine of FIG. 1 focusing on the saw indexing feature of the present invention.

Referring to FIG. 2, an indexing apparatus 36 includes a housing 38 and an index finger 40. The indexing apparatus 36 is clamped to a frame 42 which also supports a pneumatically driven clamp 44. The pneumatic clamp 44 includes a reciprocating shaft 46 that is driven into and out frictional engagement with the saw blade 16 by a pneumatic cylinder 48. When activated by the cylinder 48, the clamping shaft 46 pinches the saw blade 16 against a saw blade guide 50 to hold it into place while a grinding operation takes place.

The operation of the indexing mechanism 36 is best shown by reference to FIGS. 3 and 3a through 5 and 5a. The indexing apparatus includes a weighted sleeve 52 which pivots freely about a pin 54. Inside the sleeve 52 the finger 40 is freely movable about a pin 56 but is constrained to move within an angled slot 58 (refer to FIG. 6). The housing 38 is tiltable about an axial pin 60 in response to pressure from the output shaft 62 of an air cylinder 64. A spring 66 biases the housing 38 at a normally horizontally level orientation.

Figure 3:
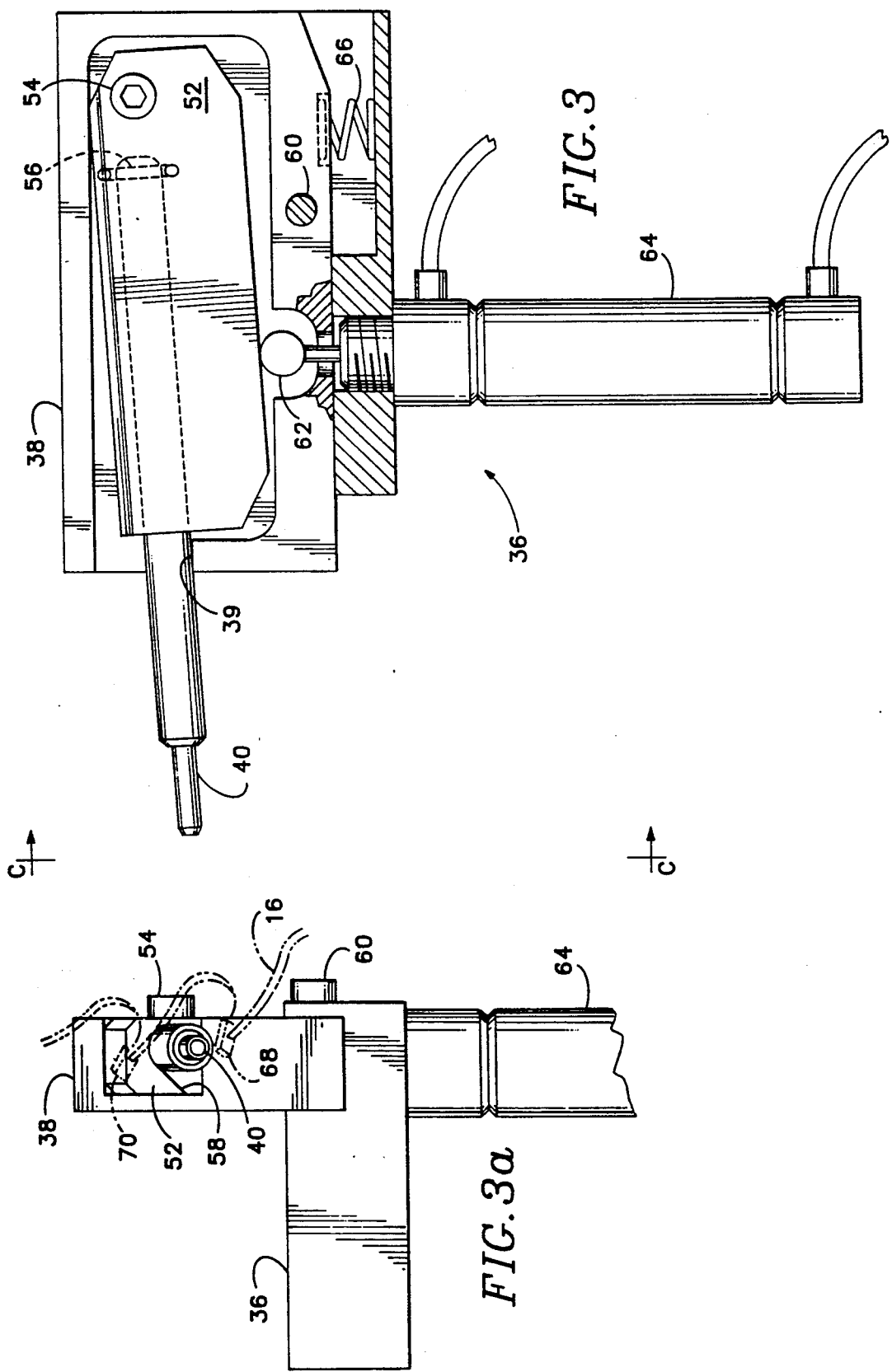
FIG. 3 is a partial cutaway side elevation view of the saw indexing apparatus of FIG. 2.
Figure 4:
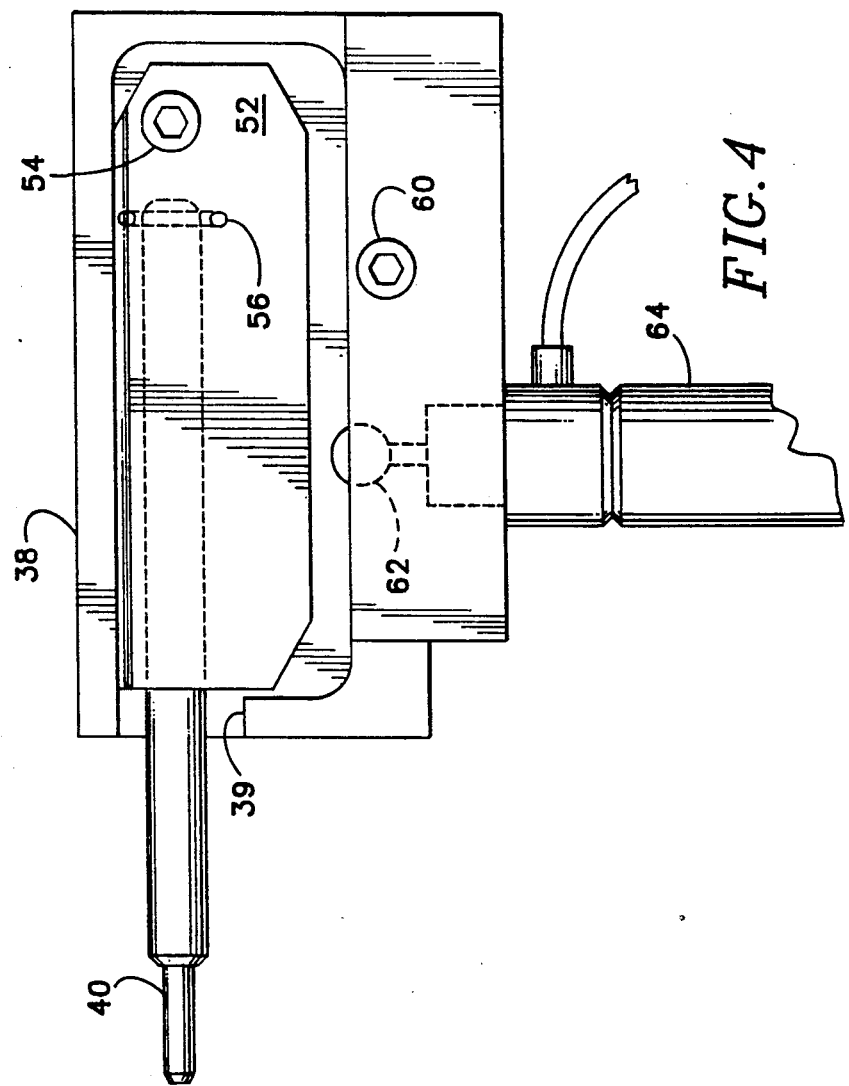
FIG. 4 is a slide elevation view of the indexing apparatus of FIG. 3 shown at a different point in the grinding sequence.
Figure 4A:
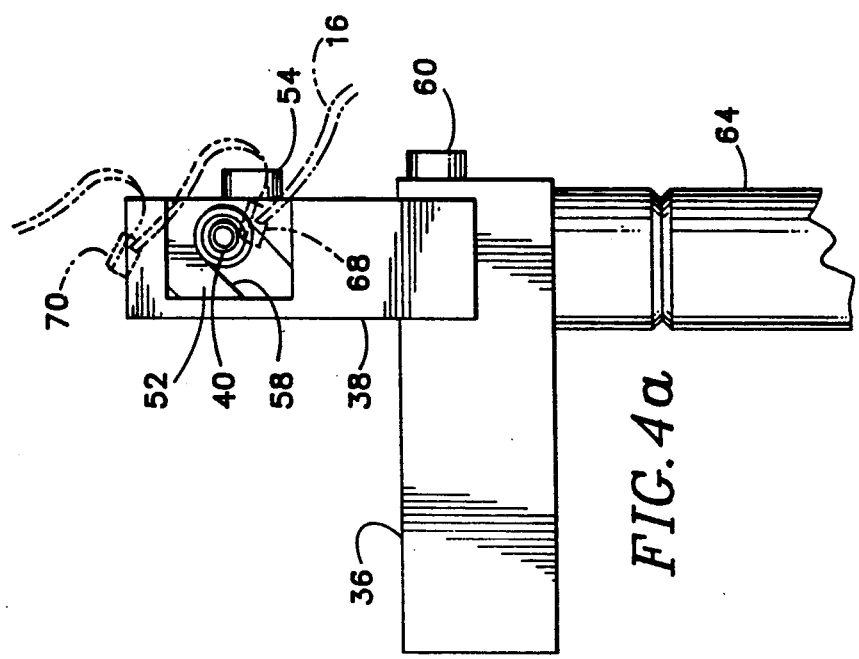
FIG. 4a is a partial front view taken along line D—D of FIG. 4.
Figure 5:
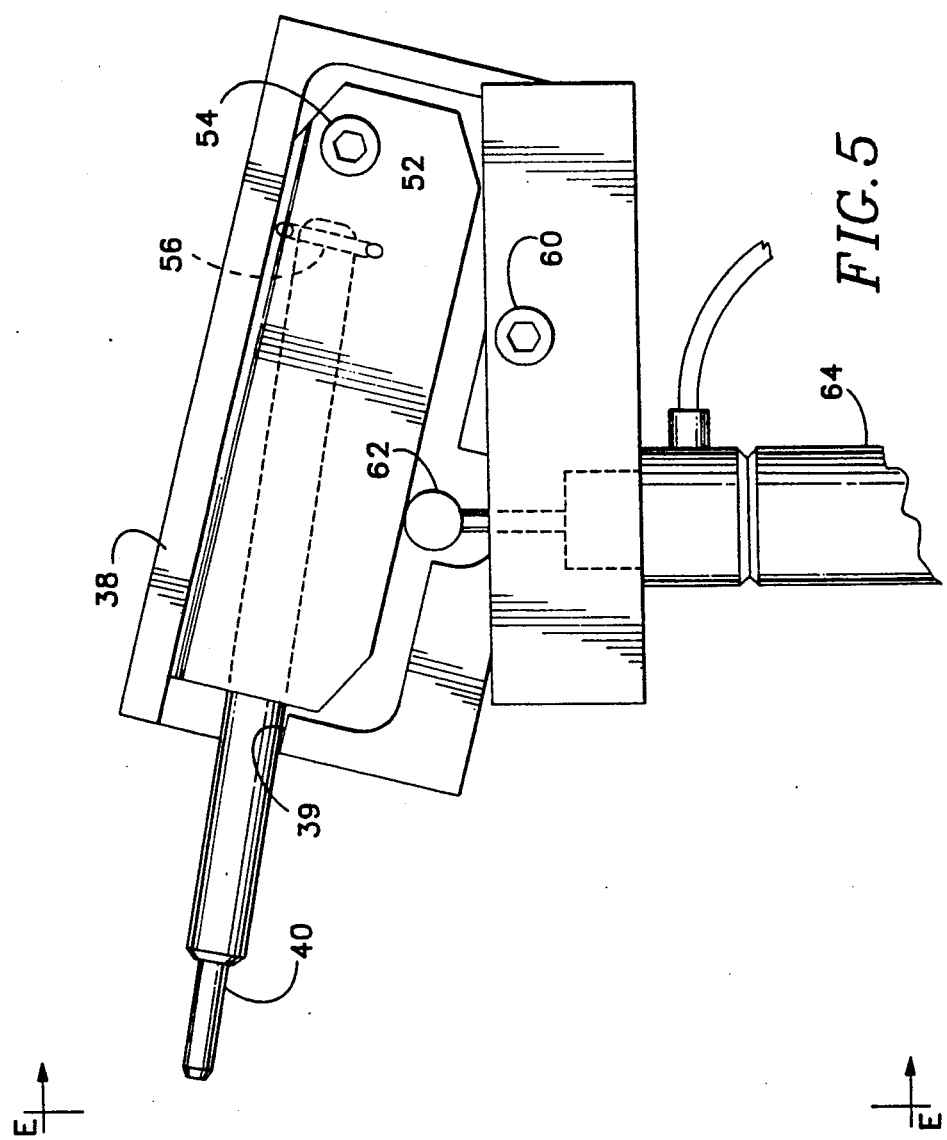
FIG. 5 is a partial slide elevation view of the indexing apparatus of FIG. 3 shown at yet another point in the grinding sequence.
Figure 5A:
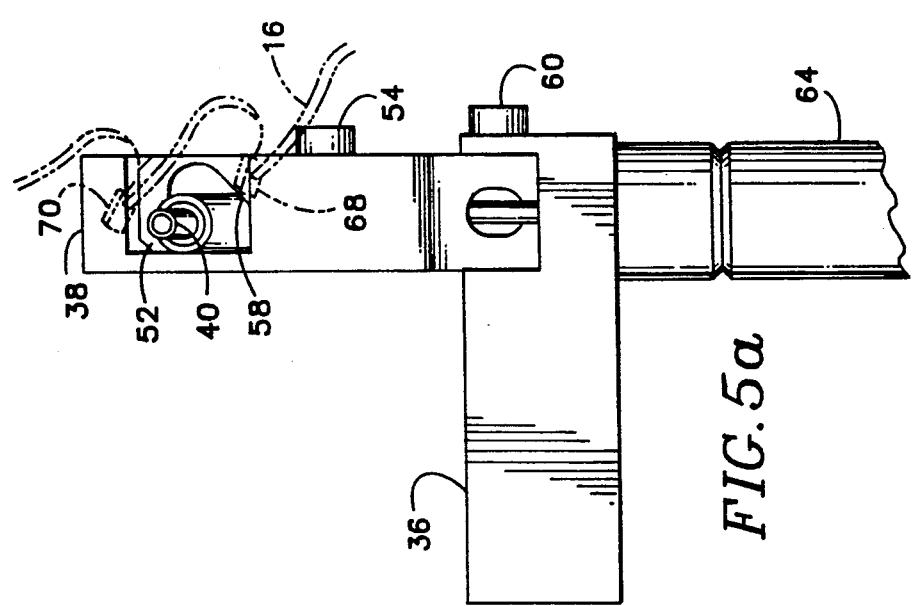
FIG. 5a is a front view of the apparatus of FIG. 5 taken along line E—E.
Figure 6:
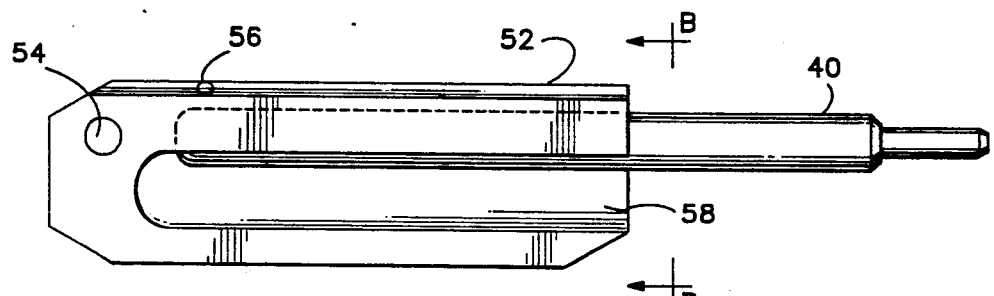
FIG. 6 is a side view of the indexing apparatus of FIG. 2 viewed from the side opposite that shown in FIGS. 3, 4 and 5.

As shown best in FIGS. 3a, 4a and 5a, the finger 40 is positioned at the end of each grinding stroke to be interposed into the path of an advancing sawtooth such as sawtooth 68 in FIG. 3a. As FIG. 4a shows, as the finger 40 intercepts the tooth 68 it is lifted by the rotation of the saw blade from the position shown in FIG. 3 to the position shown in FIG. 4 where the weighted sleeve 52 contacts the top of the housing 38. At this point the slip clutch 22 releases the shaft 20 from the motor 18 and rotation of the blade 16 ceases. Once this occurs, the pneumatic cylinder 48 slides clamping shaft 46 over to clamp the saw blade 16 against the saw guide 50. A grinding stroke by grinding assembly 12 then commences to grind the top of a sawtooth such as sawtooth 70. Once the sawtooth has been ground, the air cylinder shaft 62 lifts against the bottom of the weighted sleeve 52 as shown in FIG. 5 and forces the entire housing 38 to rotate about its axial pin 60. This permits the index finger 40 which is freely movable about pin 56 to fall at an angle through the slot 58 to a position which is retracted from the sawtooth 68 and is outside the plane of the saw blade 16.

Figure 6A:
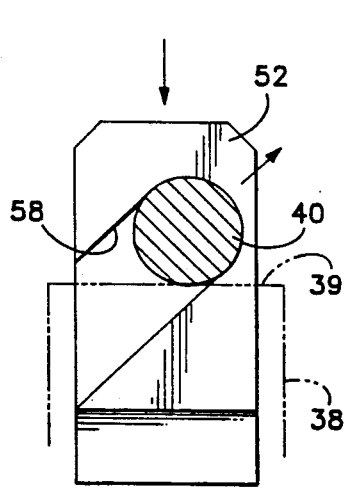
FIG. 6a is a front view of the apparatus of FIG. 6 taken along line B—B showing an index finger positioned to catch an advancing tooth of the saw blade and stop its rotation.
Figure 6B:
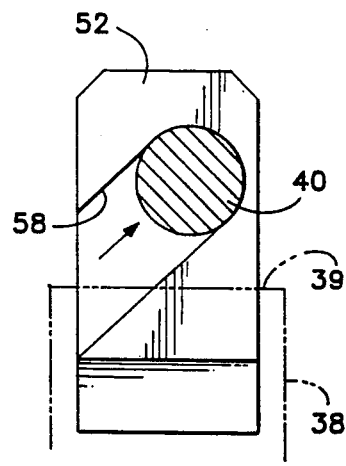
FIG. 6b is the same view as FIG. 6a but shows the position of the index finger while holding a sawtooth during a grinding stroke.
Figure 6C:
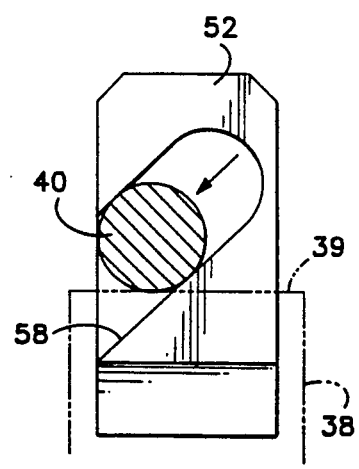
FIG. 6c is the same view as FIG. 6b but shows the orientation of the index finger after it has been retracted from the plane of the saw blade.

Another view of this sequence is best shown in FIGS. 6 and 6a through 6c. Referring to FIG. 6a the arrow pointing in the downward direction indicates that the weight of the weighted sleeve 52 is pushing against the finger 40 as the finger rests upon a lip 39 of the housing 38. This forces the finger into the upper corner of the angled slot 58 which is cut into the weighted sleeve at an angle of approximately 45°. In this position the finger 40 is interposed into the plane of the saw blade 16 so that it will catch the next advancing tooth as shown in FIG. 3a. In FIG. 6b a sawtooth 68 has lifted the finger 40 and has caused the sleeve 52 to rotate about pin 54 to the position shown in FIG. 4 and 4a. This keeps the finger 40 in the upper corner of slot 58 as shown by the arrow in FIG. 6b. FIG. 6c shows the finger retracted from the plane of the blade 16. This occurs because the air cylinder 64 lifts the housing 38 until finger 40 clears the sawtooth 68. Since the finger 40 rotates freely about pin 56 it is free to drop through the slot to the lower corner as indicated by the arrow. The angle of the slot 58 allows the finger 40 enough lateral movement to retract it clear of the plane of the saw blade 16 to permit advancement of the teeth for the grinding operation. The orientation of the finger 40 in FIG. 6c is essentially that shown in FIG. 5 viewing the entire assembly from the side. The cycle is repeated when the air cylinder shaft 62 is retracted thereby allowing the housing 38 to drop and the weighted sleeve 52 to bear against the finger 40 driving it to the upper corner of the slot 58 as shown in FIG. 6a.

The above sequence is controlled by a timing cam (not shown) which has a cycle time that is slow enough to accommodate the largest expected gap between sawteeth. The speed of the timing cam is variable and can be set to faster speeds for teeth that are closer together. The timing cam may be coupled to the output of the motor 24. The speed of this motor controls the frequency of the grinding strokes, and the pneumatic cylinder 48 and the air cylinder 64 are actuated by the timing cam in relation to the grinding cycle.

Once the saw blade 16 has been clamped into position, the grinding wheel 24 commences a grinding stroke which passes the grinding wheel across the top or face of a sawtooth. As stated above the grinding wheel assembly 12 is supported on a bearing 30 which moves reciprocally within a cylinder 72 driven by a piston 32 (refer to FIG. 7). The piston 32 is connected to a ball joint 74 at the end of a rocker arm assembly 76 which includes a walking beam 78. The beam 78 is rotatably mounted on a fulcrum 80 which includes a central axis 82 and a cylindrical cam 84 coextensive with the axis 82 but eccentric with respect to it. The opposite end of the beam 78 includes a roller pin 86 (shown best in FIG. 7a) which rests within a race 88 journaled into a cam wheel 90. The cam wheel 90 has an inner cam portion 92 whose shape is programmed to cause the beam 78 to rock up and down with each revolution of a cam wheel 90. This pushes the piston 32 up and down along its axis thus providing a reciprocal grinding stroke motion for the grinding wheel assembly 12.

The position of the stroke along the axis of the piston is adjusted by moving a lever 94 connected to a wheel 96 whose central axis is axis 82. This alters the orientation of the cam cylinder 84 to establish different upper and lower limits for the stroke of the piston 32. (The movement of the cam cylinder 84 includes a small transverse component which is easily accommodated by the ball joint 74, and the other end of the beam 78 is movable within the race 88.) As shown best by reference to FIG. 7b, the motor 24 causes cam wheel 90 to rotate which in turn causes the beam 78 to seesaw about the fulcrum 80 thus providing a grinding stroke. The position of the stroke is easily adjustable with the lever 94 and the cam obviates the need for microswitches. A tightening knob 98 is mounted on a bolt 100 which rests in an arcuate slot 102 in wheel 96. Once the stroke position has been set by the lever 94 the knob 98 is tightened which clamps the wheel 96 in place.

The terms and expressions which have been employed in the foregoing abstract and specification are used therein as terms of description and not of limitation, and there is no intention in the use of such terms and expressions of excluding equivalents of the features shown and described or portions thereof, it being recognized that the scope of the invention is defined and limited by the claims which follow.

What is claimed is:

1. A top and face grinder for a circular saw blade comprising:
   (a) powered grinding wheel means for sharpening sawteeth;
   (b) piston means supporting the grinding wheel means and movable to provide a reciprocating grinding stroke;
   (c) rocker arm means coupled to the piston means for driving the piston reciprocally along a grinding stroke axis, said rocker arm means having a beam pivoted about a fulcrum, said fulcrum including cam means for regulating the position of the grinding wheel means along the stroke axis.

2. The top and face grinder of claim 1 including rotary drive means for said rocker arm means comprising a cam having a race for receiving a roller pin affixed to an end of said beam.

3. The top and face grinder of claim 1 wherein said cam means includes an adjustment lever coupled thereto for selectively rotating a cylindrical cam extending through said beam and eccentric to an axial line of said fulcrum.

4. The top and face grinder of claim 3 further including clamping means for securing said adjustment lever after said cam has been rotated to a predetermined position.

* * * * *

UNITED STATES PATENT AND TRADEMARK OFFICE
CERTIFICATE OF CORRECTION

PATENT NO. : 5,101,690

DATED : April 7, 1992

INVENTOR(S) : James Emter

It is certified that error appears in the above-identified patent and that said Letters Patent is hereby corrected as shown below:

Col. 3, Line 58:   after out insert --of--

Col. 4, Line 49:   insert --next-- after for the

Signed and Sealed this

Fourteenth Day of September, 1993

Attest:

BRUCE LEHMAN

*Attesting Officer*   *Commissioner of Patents and Trademarks*